(12) United States Patent
Mestar et al.

(10) Patent No.: US 11,042,443 B2
(45) Date of Patent: Jun. 22, 2021

(54) FAULT TOLERANT COMPUTER SYSTEMS AND METHODS ESTABLISHING CONSENSUS FOR WHICH PROCESSING SYSTEM SHOULD BE THE PRIME STRING

(71) Applicant: California Institute of Technology, Pasadena, CA (US)

(72) Inventors: Lini Mestar, Pasadena, CA (US); David C Foor, Pasadena, CA (US); William D Whitaker, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 29 days.

(21) Appl. No.: 16/653,544

(22) Filed: Oct. 15, 2019

(65) Prior Publication Data

US 2020/0125463 A1 Apr. 23, 2020

Related U.S. Application Data

(60) Provisional application No. 62/746,760, filed on Oct. 17, 2018.

(51) Int. Cl.
*G06F 11/14* (2006.01)
*G06F 11/22* (2006.01)
*G06F 11/20* (2006.01)
*G06F 11/30* (2006.01)

(52) U.S. Cl.
CPC ...... *G06F 11/1417* (2013.01); *G06F 11/2028* (2013.01); *G06F 11/2242* (2013.01); *G06F 11/3013* (2013.01)

(58) Field of Classification Search
CPC .... G06F 11/142; G06F 11/1425; G06F 11/20; G06F 11/202; G06F 11/2023; G06F 11/2025; G06F 11/2028; G06F 11/2242; G06F 11/3013; H04L 69/40
See application file for complete search history.

(56) References Cited

U.S. PATENT DOCUMENTS

| | | | |
|---|---|---|---|
| 4,610,013 A * | 9/1986 | Long | G06F 11/0724 714/11 |
| 5,884,018 A * | 3/1999 | Jardine | G06F 11/0724 714/4.5 |
| 8,392,869 B2 | 3/2013 | Heaps et al. | |

(Continued)

OTHER PUBLICATIONS

Fault Management Handbook—National Aeronautics and Space Administration, NASA Technical Handbook, Draft 2—NASA-HDBK-1002—April 2, 2012, 203 pgs.
Caulfield, "Application of Redundant Processing to Space Shuttle", IFAC Proceedings vols. 14, No. 2 (1981), pp. 2461-2466.
Neumann et al., "A Study of Fault-Tolerant Computing.", Stanford Research Inst Menlo Park CA, 1973, 232 pgs.

(Continued)

*Primary Examiner* — Gabriel Chu
(74) *Attorney, Agent, or Firm* — KPPB LLP

(57) ABSTRACT

Systems and methods for fault tolerant computing in accordance with various embodiments of the invention are disclosed. Fault tolerant computer systems in accordance with a number of embodiments of the invention include multiple processing systems supervised by a Fault Management Unit (FMU). The FMU can build a representation of the state of all of the multiple processing systems and then determines which of the processing systems to utilize to perform a particular function based upon this state representation.

20 Claims, 12 Drawing Sheets
(10 of 12 Drawing Sheet(s) Filed in Color)

(56) References Cited

U.S. PATENT DOCUMENTS

| | | | |
|---|---|---|---|
| 10,592,342 B1* | 3/2020 | Sokolova | G06F 11/2079 |
| 2005/0177766 A1* | 8/2005 | Lee | G06F 11/008 |
| | | | 714/11 |
| 2007/0076591 A1* | 4/2007 | Khan | H04L 65/80 |
| | | | 370/216 |
| 2008/0120177 A1* | 5/2008 | Moscirella | G06Q 30/0209 |
| | | | 705/14.12 |
| 2009/0164565 A1* | 6/2009 | Underhill | H04L 41/042 |
| | | | 709/203 |
| 2012/0042032 A1* | 2/2012 | Fredette | H04L 7/0012 |
| | | | 709/214 |
| 2014/0095925 A1* | 4/2014 | Wilson | G06F 11/2028 |
| | | | 714/4.12 |
| 2015/0186229 A1* | 7/2015 | Bortnikov | G06F 11/2041 |
| | | | 714/4.11 |
| 2015/0339200 A1* | 11/2015 | Madduri | G06F 11/1425 |
| | | | 714/4.11 |
| 2020/0089585 A1* | 3/2020 | Konoura | G06F 11/3006 |

OTHER PUBLICATIONS

Pedar, "Fault-tolerant computing concepts for aerospace applications—a survey", Proceedings of the Indian Academy of Sciences Section C: Engineering Sciences vol. 3, Pt. 2, 1980, 89-128.

Schneider et al., Validating requirements for fault tolerant systems using model checking. In Proceedings of IEEE International Symposium on Requirements Engineering: RE'98, IEEE, Apr. 1998, 10 pgs.

Trivedi et al., "Hybrid reliability modeling of fault-tolerant computer systems", Computers & electrical engineering 11, no. 2-3, 1984, 87-108.

* cited by examiner

| | | | | | | | |
|---|---|---|---|---|---|---|---|
| outputs | Diag Fail | | | | | | |
| | Prime is B | | | | | | |
| | Prime is A | | | | | | |
| | Initial Prime | | | | | | |
| Prime | Other is Prime | | | | | | |
| | I Am Prime | | | | | | |
| Dynamic Modes | Online | | | | | | |
| | Ready | | | | | | |
| | Runtime | | | | | | |
| | String Power Enable | | | | | | |
| | Prime Init Done | | | | | | |
| | SH Up | | | | | | |
| | SH Power Good | | | | | | |
| | Diag Mode | | | | | | |
| | Sleep Mode | | | | | | |
| CSC Inputs | Force Single | | | | | | |
| | Boot String | | | | | | |
| PWB Inputs | Single String Pin | | | | | | |
| | Side Pin | | | | | | |
| Collector Inputs | Data from Processor B collector | | | | | | |
| | Data from Processor A collector | | | | | | |
| | Data from String Handler B collector | | | | | | |
| | Data from String Handler A collector | | | | | | |
| | Data from ETM B collector | | | | | | |
| | Data from ETM A collector | | | | | | |

FIG. 7

| item | data point | description |
|---|---|---|
| | ETM critical health and support data | |
| 1 | ETM clock alive | signal which shows the clock is running (could be 1PPS) |
| 2 | ETM good | some flag asserted when the ETM is properly running (including handshake) |
| 3 | ETM in sleep mode | flag asserted when the ETM is sleeping |
| 4 | ETM in diag mode | flag asserted when the ETM is in diag mode |
| 5 | CSC vote error | CSC vote mismatch |
| 6 | ETM state machine errors | illegal state |
| 7 | processor power good flag | processor PGOOD should match the state it should be in (on or off) |
| | processor FPGA critical health and support data | |
| 8 | FSW WDT stroke | the main WDT stroke over SPI |
| 9 | SPI packet checksum error | verify that SPI packets are coming from the processor without errors |
| 10 | processor boot success | verify that key SPI actions during each boot stage are carried out |
| 11 | FMU-FMU transfer error | assert if FMU is not properly exchanging MRAM data with the other FMU |
| 12 | illegal address access | asserts for typical address access errors on SPI |
| 13 | FMU state machine errors | illegal state |
| 14 | FMU in diag mode | flag asserted when the FMU is supporting diag mode |
| | processor critical health and support data | |
| 15 | processor pulse or error pin to FPGA? | do we have some processor health/error pin going to the FPGA |
| 16 | processor FPGA internal errors | asserts for a variety of errors in the processor FPGA |
| 17 | PCI errors | asserts for critical errors on PCI (what ever those are) |
| 18 | processor FPGA state machine errors | illegal state |

FIG. 8

FAULT TOLERANT COMPUTER SYSTEMS AND METHODS ESTABLISHING CONSENSUS FOR WHICH PROCESSING SYSTEM SHOULD BE THE PRIME STRING

CROSS-REFERENCE TO RELATED APPLICATIONS

The current application claims priority to U.S. Patent Application Ser. No. 62/746,760, entitled "Innovative Solution For Fault Detection in Small Spacecraft Avionics" filed Oct. 17, 2018, the disclosure of which is incorporated herein by reference.

STATEMENT OF FEDERAL SUPPORT

This invention was made with government support under Grant No. 80NM0018D004 awarded by NASA (JPL). The government has certain rights in the invention.

FIELD OF THE INVENTION

The present invention relates generally to fault tolerant computer systems and more specifically to fault tolerant computer systems that include two or more processing systems.

BACKGROUND

The concept of "fault tolerance" generally relates to the ability of a system to withstand faults. The field of fault tolerant computing is generally concerned with the construction of computers that possess the ability to withstand various kinds of hardware and software malfunctions and mishaps. There are varying degrees of fault tolerance. In many fault tolerant computing systems, some or all of the system is capable of continued correct performance despite the occurrence of a fault. In other circumstances, some or all of the system may continue to operate but with degraded capacity.

In the context of fault tolerant computing, a "fault" or "error" are often defined at a component or subsystem level. Many sub-systems incorporate fault-tolerant capabilities that can prevent a fault within a sub-system from causing the sub-system to generate errors. A "fault" or "error" is said to be present when the incorrect behavior of that component or subsystem is observable to some other component or subsystem. An "error" can be considered to be a disparity between the actual output at such an interface and the expected value under normal operation. Examples can include (but are not limited to) an incorrect result form an arithmetic logic unit in a microprocessor, a retrieval from memory of a value that is different to the value that was stored in the memory, and/or an incorrect value being observed at an input or output device. Errors may be detected or undetected. An example of a detected error would be retrieval of an incorrect value from memory that can be detected by way of a parity bit. An example of an undetected error is the reading of an incorrect value from an input interface connected to a temperature sensor. Undetected errors typically are not capable of detection at the interface between the subsystem at which the fault has occurred and another subsystem. However, these undetected errors may be subsequently detected at another (higher-level) interface, e.g., via consistency checks.

Faults may be transient, intermittent, or permanent. A transient fault is one that occurs once. For example, a transient fault in hardware can leave the hardware in a fault-free condition, but with possible effects on the software and on system operation. An intermittent fault is one that can recur, with intervening fault-free periods. A permanent fault is one that persists steadily without interruption. In many instances, a transient fault may become intermittent, and an intermittent fault may become permanent.

In many critical applications, such as aerospace applications, fault tolerance is achieved using redundancy. In these systems, fault tolerance is achieved by providing multiple similar processing systems that execute in parallel. One of the systems is typically selected as what is referred to as a "prime string" or "prime" and it is this system that has control of the system bus and/or other system resources. The other processing systems are referred to as the online string(s), which provide backup, executing in synchronization or in near-synchronization with the prime string. The addition of redundant systems also requires the addition of sub-systems to monitor each of the redundant systems, which are often referred to as "voters", and a sub-system that performs the supervisory function of selecting between the redundant systems based upon information received from the voters. When the voter monitoring the execution of the prime system detects a fault, the supervisor will typically select one of the other redundant systems to serve as the prime based upon the outputs of their respective voters.

Attempts have been made to measure fault tolerance. Fault tolerance can be expressed in terms of a "mean time to failure" of a system. More sophisticated measures can look at the probability as a function of time that certain resources are available and/or that certain data within a system are correct. For systems where the system is so remote as to preclude maintenance, such as those used in many space applications, important measures become the probability that the critical functions of the system will continue to operate correctly after a particular period of time.

SUMMARY OF THE INVENTION

Systems and methods for fault tolerant computing in accordance with various embodiments of the invention are disclosed. Fault tolerant computer systems in accordance with a number of embodiments of the invention include multiple processing systems supervised by a Fault Management Unit (FMU). The FMU can build a representation of the state of all of the multiple processing systems and then determines which of the processing systems to utilize to perform a particular function based upon this state representation.

One embodiment includes: a plurality of processing systems that are each capable of performing as a prime string; and a Fault Management Unit, where the FMU includes Event Timer (ET) circuitry and String Handler (SH) circuitry for each of the plurality of processing systems. In addition, each SH circuitry is capable of: interfacing with one of the plurality of processing systems in a manner that creates an isolated fault containment boundary with respect to the processing system; obtaining input data via its interface with one of the plurality of processing systems; and providing input data to each ET circuitry via redundant communication paths. Furthermore, each ET circuitry comprises a state table, where state in the state table comprises inputs from each of the plurality of processing systems. Additionally, each ET circuitry is capable of assigning a selected processing system from the plurality of the processing systems to be the prime string based upon input data from each SH circuitry and the state table, and the FMU assigns the selected processing system as the prime string when there is consensus between the ET circuitry that the selected processing system should be the prime string.

In a further embodiment, each SH circuitry is also capable of obtaining input data from a collector within the SH circuitry.

In another embodiment, each ET circuitry is capable of obtaining input data from a collector within the ET circuitry and providing input data to each of the other ET circuitry via redundant communication paths.

In a still further embodiment, each ET circuitry further comprises a Prime State Machine (PSM), where the PSM assigns a selected processing system from the plurality of the processing systems to be the prime string based upon the state table.

In still another embodiment, the PSM include two paths: a first path when a processing system associated with the PSM is assigned as the prime string; and a second path when a processing system associated with the PSM is assigned to be an offline string.

In a yet further embodiment, prior to booting of the processing systems, the PSM assigns a selected processing system from the plurality of the processing systems to be the prime string based upon Critical State Control (CSC) parameters retrieved from non-volatile memory.

In yet another embodiment, the state table indicates the processing system from the plurality of processing systems that should be assigned as the prime string based upon inputs from the plurality of processing systems.

In a further embodiment again, the state table further comprises dynamic inputs that represent a current mode of the selected processing system.

In another embodiment again, each ET circuitry evaluates whether the selected processing system should remain the prime string and assigns the prime string to a second of the plurality of processing systems based upon input data from the SH circuitry and the state table, and the FMU assigns the second processing system to be the prime string when there is consensus between the ET circuitry that the second processing system should be the prime string In a further additional embodiment, the FMU is synchronized to a common Real Time Interrupt (RTI) and, during operation of the selected processing system as the prime string, each ET circuitry evaluates whether the selected processing system should remain the prime string once per RTI.

In another additional embodiment, the SH circuitry is capable of providing input data to each ET circuitry via Triple Mode Redundancy (TMR) in all logic and interfaces.

In a still yet further embodiment, input data received via the TMR are voted and corrected by each ETM.

In still yet another embodiment, the SH circuitry associated with the selected processing system is capable of booting the selected processing system following its selection as the prime string.

In a still further embodiment again, the SH circuitry associated with the selected processing system comprises a String Handler Boot Controller state machine that supervises the booting of the selected processing system.

In still another embodiment again, the booting of the selected processing system comprises a plurality of phases.

In a yet further embodiment again, the boot phases of the of the selected processing system are defined within a Startup ROM (SUROM) and a software image is selected during booting of the processing system by an Initial Partition Loader (IPL) identified within the SUROM.

In yet another embodiment again, the SH circuitry associated with a non-prime processing system is capable of booting the non-prime processing system in a diagnostic mode and establishing a communication path between the selected processing system that is the prime string and the non-prime processing system that is booted in the diagnostic mode.

In a still further additional embodiment, each ET circuitry and SH circuitry is implemented on a separate Field Programmable Gate Array (FPGA).

In still another additional embodiment, the selected processing system is capable of performing the functions of an avionics system.

Another embodiment of the invention includes: a plurality of processing systems that are each capable of performing as a prime string; and a Fault Management Unit, where the FMU includes Event Timer (ET) circuitry and String Handler (SH) circuitry for each of the plurality of processing systems. In addition, each SH circuitry is capable of: interfacing with one of the plurality of processing systems in a manner that creates an isolated fault containment boundary with respect to the processing system; obtaining input data via its interface with one of the plurality of processing systems; capable of obtaining input data from a collector within the SH circuitry; and providing input data to each ET circuitry via redundant communication paths. In addition, each ET circuitry is capable of obtaining input data from a collector within the ET circuitry and providing input data to each of the other ET circuitry via redundant communication paths; each ET circuitry comprises a state table, where state in the state table comprises inputs from each of the plurality of processing systems, each SH circuitry, and each ET circuitry; and each ET circuitry is capable of assigning a selected processing system from the plurality of the processing systems to be the prime string based upon input data and the state table. Furthermore, the FMU assigns the selected processing system as the prime string when there is consensus between the ET circuitry that the selected processing system should be the prime string; the FMU is synchronized to a common Real Time Interrupt (RTI) and, during operation of the selected processing system as the prime string, each ET circuitry evaluates whether the selected processing system should remain the prime string once per RTI; the ET circuitry associated with the selected processing system determines that the prime string should be transitioned to a second of the plurality of processing systems based upon input data and the state table; and the FMU assigns the second processing system to be the prime string when there is consensus between the ET circuitry that the second processing system should be the prime string.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 7 is an example of an avionics state table in accordance with an embodiment of the invention.

FIG. 8 is an example of input data collected by various collectors within an avionics system in accordance with an embodiment of the invention.

DETAILED DESCRIPTION

Figure 1:
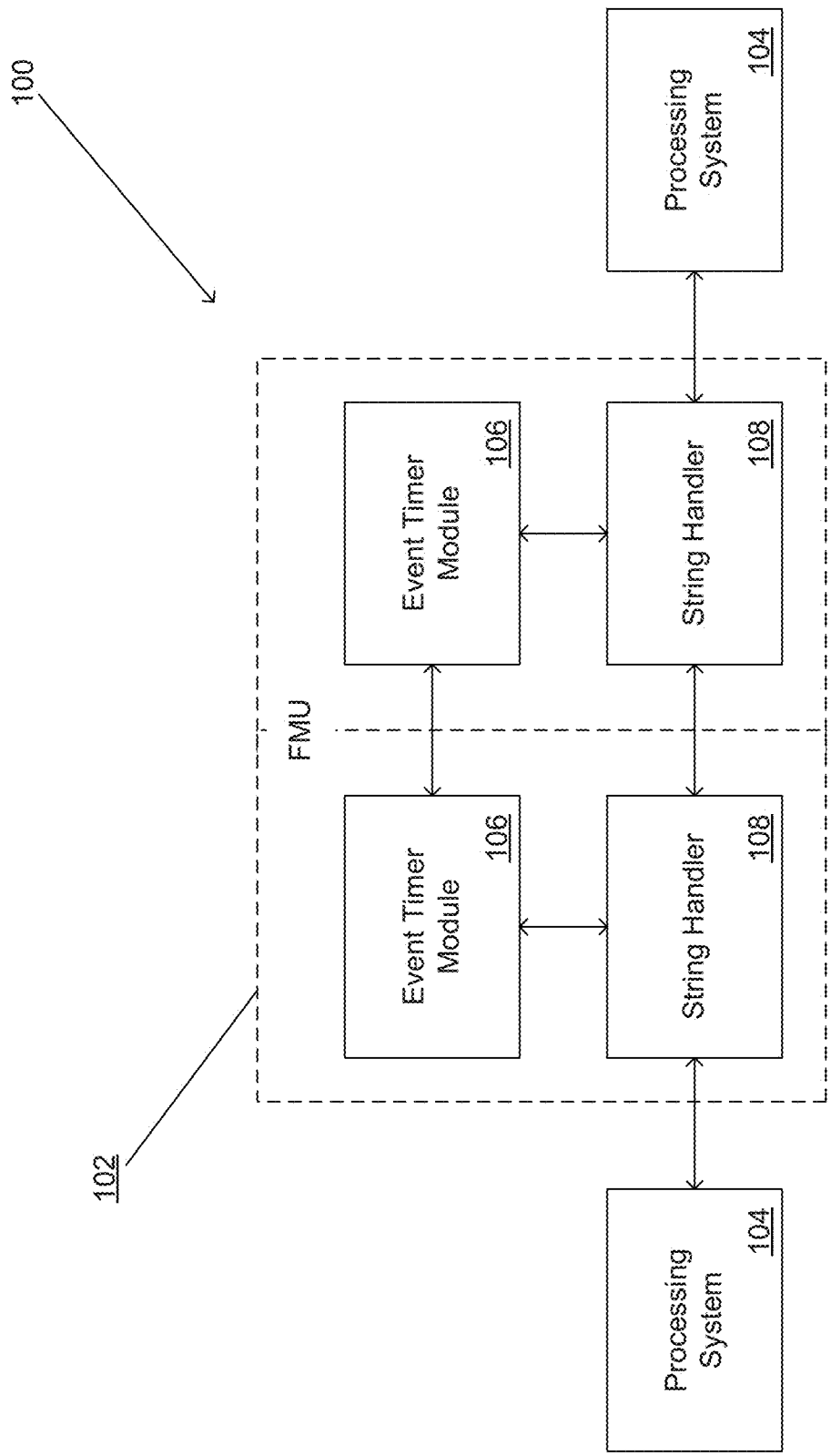
FIG. 1 is a block diagram of a fault tolerant computer system in accordance with an embodiment of the invention.

Turning now to the drawings, systems and methods for fault tolerant computing in accordance with various embodiments of the invention are illustrated. Fault tolerant computer systems in accordance with a number of embodiments of the invention include multiple processing systems supervised by a Fault Management Unit (FMU). The FMU can build a representation of the state of all of the multiple processing systems and then determines which of the processing systems to utilize to perform a particular function based upon this state representation.

In several embodiments, the FMU builds the state representation by collecting input data from throughout the processing systems and the sub-systems of the FMU of the fault tolerant computer system. In certain embodiments, the FMU builds a state representation for the fault tolerant computer system from a variety of inputs that are informative with respect to the determination of which processing system to select as the prime to perform a specific processing operation. Where the processing systems incorporate multiple subsystems, the FMU can obtain inputs to the state representation from the sub-systems. In this way, the FMU can isolate faults that may be responsible for specific behaviors observed in the behavior of a given processing system. As the fault tolerant computer system degrades over time, information concerning the location of particular faults can enable selection of a processing system to act as the prime string to perform a specific operation and selection of a second processing to act as prime with respect to a follow-on operation based upon the functionality of the sub-systems within each of the respective processing systems.

FMUs in accordance with many embodiments of the invention can determine the processing system that should be prime using the current state representation of the fault tolerate computing system. In a number of embodiments, a processing system retains its status as the prime when it is able to satisfy specific requirements to be prime. In several embodiments, the state table maintained by the FMU determines the processing system that should be selected as the prime string. The specific inputs received by the FMU FMUs in accordance with many embodiments of the invention implement an Event Timer Module (ETM) and a String Handler (SH) for each of the multiple processing systems. The boundary between the processing system and the FMU can be considered to be a completely isolated fault containment boundary. In certain embodiments, the SH is responsible for monitoring the performance of a processing system and works with one or more SHs monitoring additional processing systems to mirror state and other key information utilized in a fail over event. In several embodiments, the SH initiates bootup of a processing system and monitors its health during execution.

In several embodiments, the majority of the FMU functionality is implemented within the ETM, which includes circuitry that is responsible for negotiating prime between the multiple processing systems and making high-level decisions regarding the health of the various sub-systems within each processing system. In a number of embodiments, the ETM monitors the state of the combination of an SH and/or its corresponding processing system. Monitoring is performed by providing logic in the form of circuitry and/or software that implements what is known as a collector. Each collector is responsible for collecting input data relevant to determination of prime and sending that input data to the state tables maintained by each of the ETMs via redundant communication paths.

In many embodiments, each ETM includes a state table and a state machine that can be referred to as a Prime State Machine (PSM). The state table is a listing of different states that can be occupied by the system including many states that are a function of faults or failures within the system. In addition, the state table provides direction regarding the processing system that should be selected as the prime string for a given set of inputs and/or context. In a number of embodiments, the PSM utilizes the state table to determine the processing system that should be the prime string and to synchronize the operation of the processing systems.

In certain embodiments, the ETM can command the pair of an SH and a processing system via the SH, where the SH performs low-level processor-specific interactions with the processing system. In various embodiments, the ETM is also capable of conducting low-level processor-specific interactions directly with the processing system. In many embodiments, the ETMs are responsible for powering up the SHs, making an initial determination with respect to the prime string, and directing a specific SH to boot its associated processing system. As the processing system progresses through one or more boot phases, the ETMs can continuously determine system state and evaluate the suitability of the booting processing system for retaining prime status. Once the processing system has successfully booted into a stable configuration, the ETMs continue to monitor system state and evaluating the suitability of the processing system to retain its prime status. In the event that the ETMs determine that the processing system is no longer suitable for retaining prime status, the ETMs can direct another SH to initiate the bootup of an alternative processing system that has been selected to take over the prime string. In a number of embodiments, the ETMs can also place processing systems into sleep modes to conserve power. In addition, the ETMs can boot a processing system into a diagnostic mode and establish a communication path between the prime processing system and the system booted in diagnostic mode. The communication path can enable the prime processing system to perform diagnostic evaluations and firmware and/or software maintenance on the offline processing system.

Fault tolerant computer systems in accordance with various embodiments of the invention can be utilized in any of a variety of applications including (but not limited to) space craft avionics. In a number of embodiments, the computer systems monitored by the FMUs can include two processing systems that each can execute the avionics software of a spacecraft such as (but not limited to) a small spacecraft (e.g.

spacecraft with weight below 50 kg). In certain embodiments, the avionics systems include (but are not limited to) the flight computer, payload interfaces, and/or telecommunication systems.

While the discussion that follows provides a number of specific examples of systems utilized in the context of aerospace applications, it should be readily apparent that the techniques described herein are equally appropriate in a host of applications including (but not limited to) transportation systems, electrical power systems, secure systems, and/or any other systems that can benefit from fault tolerant operation. Fault tolerant computing systems that incorporate FMUs that rely upon state tables to select one of a number of processing systems as a prime string in accordance with various embodiments of the invention are discussed further below.

Fault Tolerant Computer Systems

Turning now to FIG. 1, a fault tolerant computer system 100 in accordance with an embodiment is illustrated. The fault tolerant computer system 100 includes an FMU 102 that monitors two or more processing systems 104. The processing systems 104 can be any form of processing system that is appropriate to the requirements of a particular application including (but not limited to) a computer system, and/or a spacecraft controller. In several embodiments, the primary function of the FMU is to maintain the state of all of the processing systems and to select a processing system as the prime string based upon the maintained state.

The boundary between the FMU 102 and the processing systems 104 can be a completely isolated fault containment boundary. In this way, faults that occur within a processing system 104 cannot or is highly unlikely to cause failure of the functionality of the FMU 102.

In the illustrated embodiment, the FMU 102 includes a separate FDU for each processing system 104, which is implemented using an ETM 106 and an SH 108. Each SH 108 is responsible for booting and interfacing with a corresponding processing system and each ETM 106 is responsible for determining which of the processing systems should be used as the prime string and which processing system(s) should be used as an offline string. The SHs 108 can collect input data that can be utilized by the ETMs 106 to determine prime. Based upon the state of the processing system maintained by each of the ETMs 106, the ETMs synchronize the handover of prime (either entirely or for the purposes of performing a particular function) in case of failure. In addition, the ETMs can monitor each other to detect and/or correct for synchronization errors. Synchronization errors can be considered to have occurred when an ETM 106 is unable to confirm consensus with the other ETMs within the FMU 102. In the context of an FMU 102, synchronization is to a common Real Time Interrupt (RTI) that is maintained by a time subsystem in each ETM 106. In a number of embodiments, the RTI can be slow compared to the processing systems (e.g. 8 Hz) in order to minimize power consumption within the FMU 102. As can readily be appreciated, the specific frequency of the RTI is largely dependent upon the requirements of a specific fault tolerant computing application. In many embodiments, each ETM 106 evaluates the specific processing system that should be utilized as prime once per RTI. The ETMs 106 can evaluate prime by determining the state of the fault tolerant computer system and referencing a state table that defines the processing system that should be the prime string given the current system state. ETMs 106 in accordance with many embodiments of the invention are continuously active including (but not limited to) during power up, during bootup of its corresponding processing system, during runtime, and during system sleep modes. While the ETM is referred to as a module, it should be readily appreciated that the ETM references digital logic that can be implemented by one or more software, Field Programmable Gate Array (FPGA), an Application Specific Integrated Circuit (ASIC), and/or discrete components. Furthermore, an ETM can be implemented with a system and/or component that implements some or all of another aspect of an FMU.

As noted above, each SH 108 can interface with a corresponding processing system 104. In addition, each SH 108 can interface with a corresponding ETM 106. In many embodiments, the SH 108 can communicate with multiple ETMs 106 using redundant communication paths. In several embodiments, the SH 108 can communicate with all of the ETMs 106 within an FMU 102. In addition to communicating with the SHs 108, the ETMs 106 can also communicate with each other to achieve synchronization. In many embodiments, SHs can be implemented on the same component as an ETM. In several embodiments, the ETM 106 controls power to the SH 108 and can place the SH in a reduced power consumption state, when the SH's corresponding processing system is in a sleep mode.

While several implementations of fault tolerant computer systems are described above with reference to FIG. 1, any of a variety of implementations including implementations that include two or more processing systems and accompanying ETMs and SHs can be utilized as appropriate to the requirements of specific applications. Various techniques for implementing FMUs and the various components utilized within FMUs in accordance with a number of embodiments of the invention are discussed further below.

Fault Management Units

Figure 2:
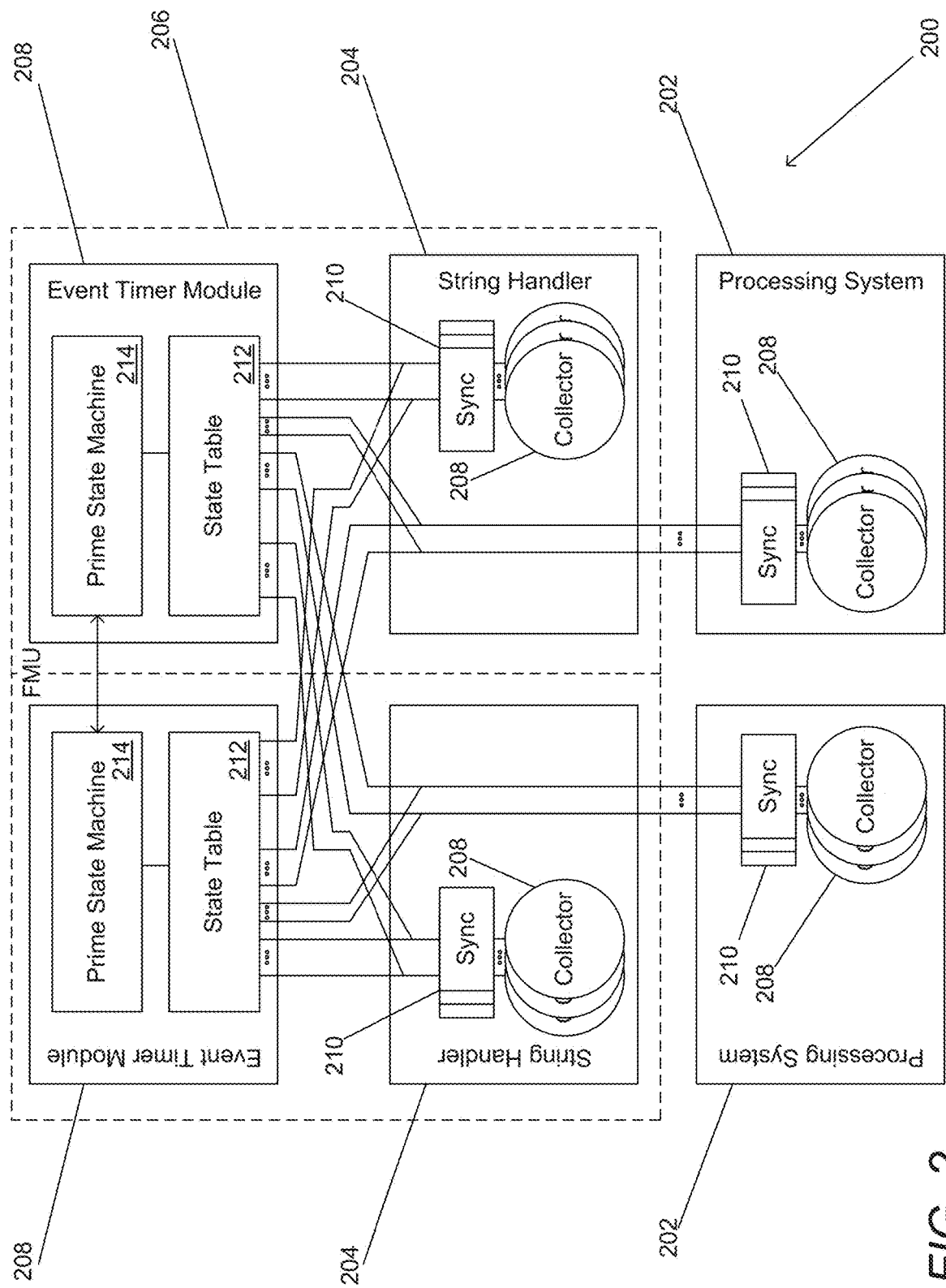
FIG. 2 conceptually illustrates the manner in which Fault Detection Units (FDUs) can build state tables and utilize the state tables to select a processing system as the prime string in accordance with an embodiment of the invention.

In many embodiments, an FMU implements a separate instantiation of a Fault Detection Unit (FDU) for each isolated processing system. Each FDU has access to all of the data within the multi-string system to make the decision that is most likely to be correct about which string to select as the prime string in response to faults and/or sub-system failures. The manner in which FDUs can build state tables and utilize the state tables to select a processing system as the prime string in accordance with an embodiment of the invention is conceptually illustrated in FIG. 2.

The fault tolerant computing system 200 includes two processing systems 202 that each interface with a SH 204 in an FMU 206. As discussed above, the interfaces between the SHs 204 and their corresponding processors 202 can create a completely isolated fault containment boundary.

In many embodiments, the FDU includes four key components: collector(s) 208; synchronizer(s) 210, a state table 212, and a prime state machine (PSM) 214. The collectors 208 aggregate data (e.g. errors, faults, watchdog failures, etc.) within a fault containment region (e.g. a sub-system). The data aggregated by a collector 208 represents all of the data which can have an effect on the determination of the ability of a string to maintain prime or take over prime.

A synchronizer 210 synchronizes a collector 208 to an RTI boundary and encodes data from the collector into a packet that is sent to each ETM 216 as input data to a state table 212. In a number of embodiments, the synchronizer transmits data via redundant paths. In this way, failure of a single communication path does not prevent a functioning collector 208 within a specific sub-system from reporting data to the ETMs 216. In many embodiments, collector 208 and synchronizer 210 pairs are found within one or more of the processing systems 202, SHs 204, and/or ETMs 216. In this way, the state of the fault tolerant computer system is not limited to reflecting faults within the processing system, but can also reflect faults within sub-systems within the components of the FMU 206. As can be readily appreciated, the specific sub-systems of a fault tolerant computer system in which collector 208 and synchronizer 210 pairs are located are largely determined by the requirements of specific applications in accordance with various embodiments of the invention.

In a number of embodiments, the ETMs 216 receive data via redundant paths from collector 208 and synchronizer 210 pairs and utilize the data to construct a state table 212. As can readily be appreciated, each ETM 216 can construct its own state table 212 with the goal that each ETM have identical knowledge of all prime-affecting information available within the fault tolerant computer system 200. The role of the state table is to receive data from the processing systems and to represent it as state. In several embodiments, the state table data inputs are represented as columns and the rows represent the unique combinations of inputs defined as the processing system state.

In a number of embodiments, the inputs to the state table can be categorized into five different types: collector inputs, PWB inputs, CSC inputs, dynamic modes, and prime. The collector inputs represent error state in the processing systems and/or the FMU sub-systems. The PWB inputs are hardwired inputs. The CSC inputs are Critical State Control parameters that are pre-defined and are stored within non-volatile memory. Dynamic modes are signals that configure the state table based upon the particular operating mode of the processing system. The dynamic modes can enable the PSM to uniquely evaluate the other inputs, weighting them or even excluding them, depending up the current mode of the processing system. The prime inputs correspond to assertions from each of the ETMs regarding the processing system that should be prime. While specific inputs to state tables utilized by ETMs are described above, any of a variety of methods can be utilized to represent state (e.g. in forms other than a table) and/or various inputs can be utilized to indicate state as appropriate to the requirements of specific applications in accordance with various embodiments of the invention.

In many embodiments, a PSM 214 executes within each ETM 216 and determines the processing system that should be prime. In several embodiments, the PSM 214 continuously makes determinations regarding the processing system that should be prime. Not all data within the state table 212 may be relevant to a determination of prime by the PSM 214 at a particular point in time.

In certain embodiments, the ability of each ETM 216 to make the correct decision based upon the data collected by the collector 208 and synchronizer 210 pairs is enabled through the use of at least Triple Mode Redundancy (TMR) in all logic and interfaces. The use of TMR effectively results in the fault tolerant computer system 200 having three redundant FDUs for each processing system. Moreover, each of these logical FDUs is effectively voted and corrected at each pipeline stage so that Single Event Upset (SEU) errors are scrubbed and prevented from propagating into the state table and/or influencing the determination of prime. As can readily be appreciated, the specific amount of redundancy implemented within a fault tolerant computer system in accordance with an embodiment of the invention is largely dependent upon the requirements of a particular application and may be influenced by the amount of redundancy that achieves a desired level of statistical immunity to logic errors, SEUs, destructive events, and/or failures at interfaces between devices, etc. Prime state machines in accordance with various embodiments of the invention are discussed further below.

Prime State Machines

In many embodiments, a PSM is implemented in each ETM within the FMU of a fault tolerant computer system. The ETM may be associated with a processing system that is currently acting as the prime string or as an offline string. Accordingly, the PSM can be implemented with two paths, one for when the processing system is prime and the other when the processing system is not prime. In many embodiments, the PSM performs an initial bootup phase in which prime is selected based upon a set of Critical State Control parameters that are retrieved from non-volatile memory. Errors and/or conflicts between PSMs are resolved to confirm the selection of prime prior to the booting of the processing systems. Once the processing systems are booted, the PSM enters a runtime mode in which updates to the state table may cause a different processing system to be selected as prime. In which case, each PSM will confirm with the other PSMs that a valid prime transition has occurred and then resume runtime operation.

Figure 3A:
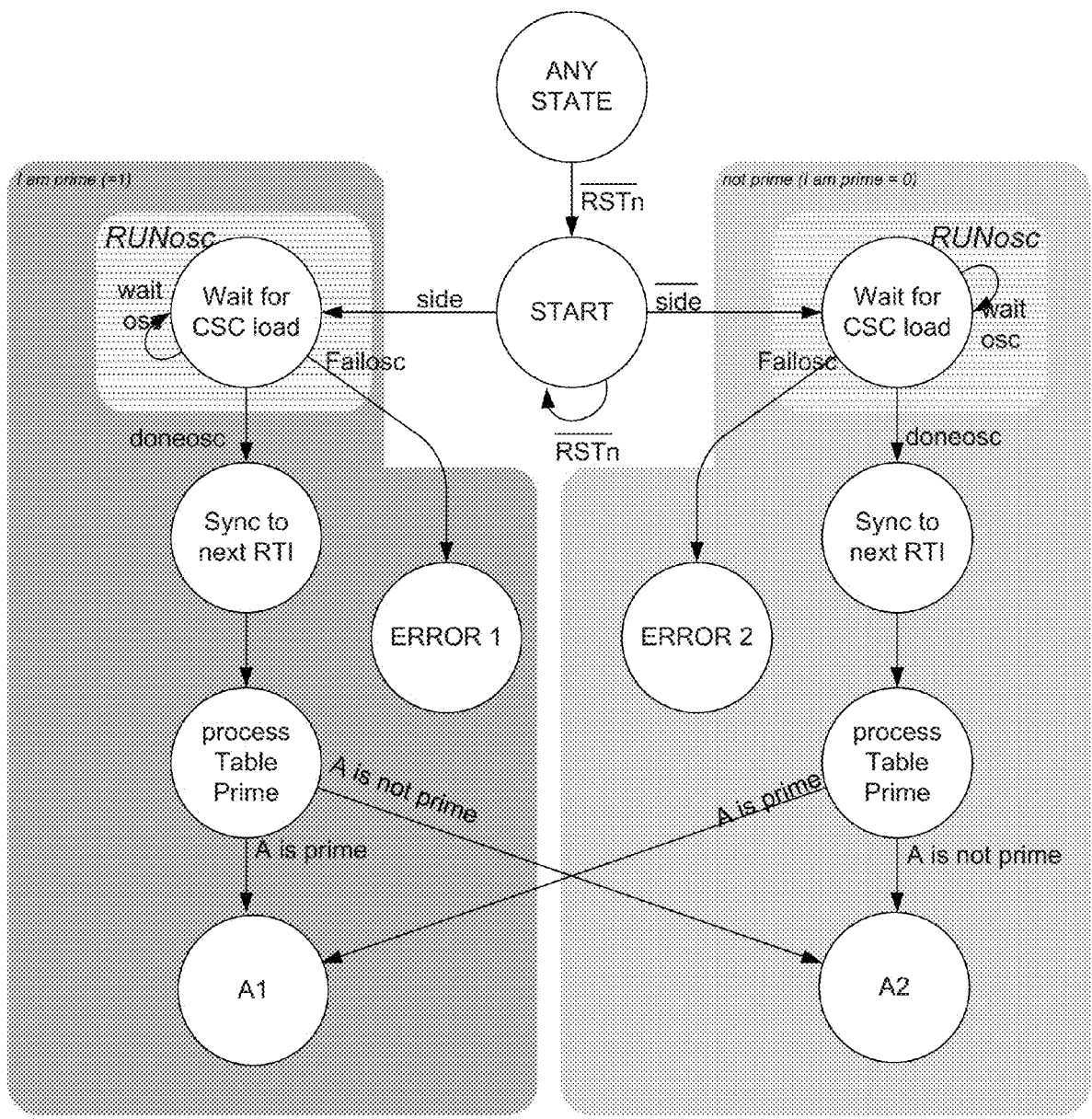
FIGS. 3A-3C conceptually illustrate an implementation of a Prime State Machine (PSM) that incorporates two paths in accordance with an embodiment of the invention.
Figure 3B:
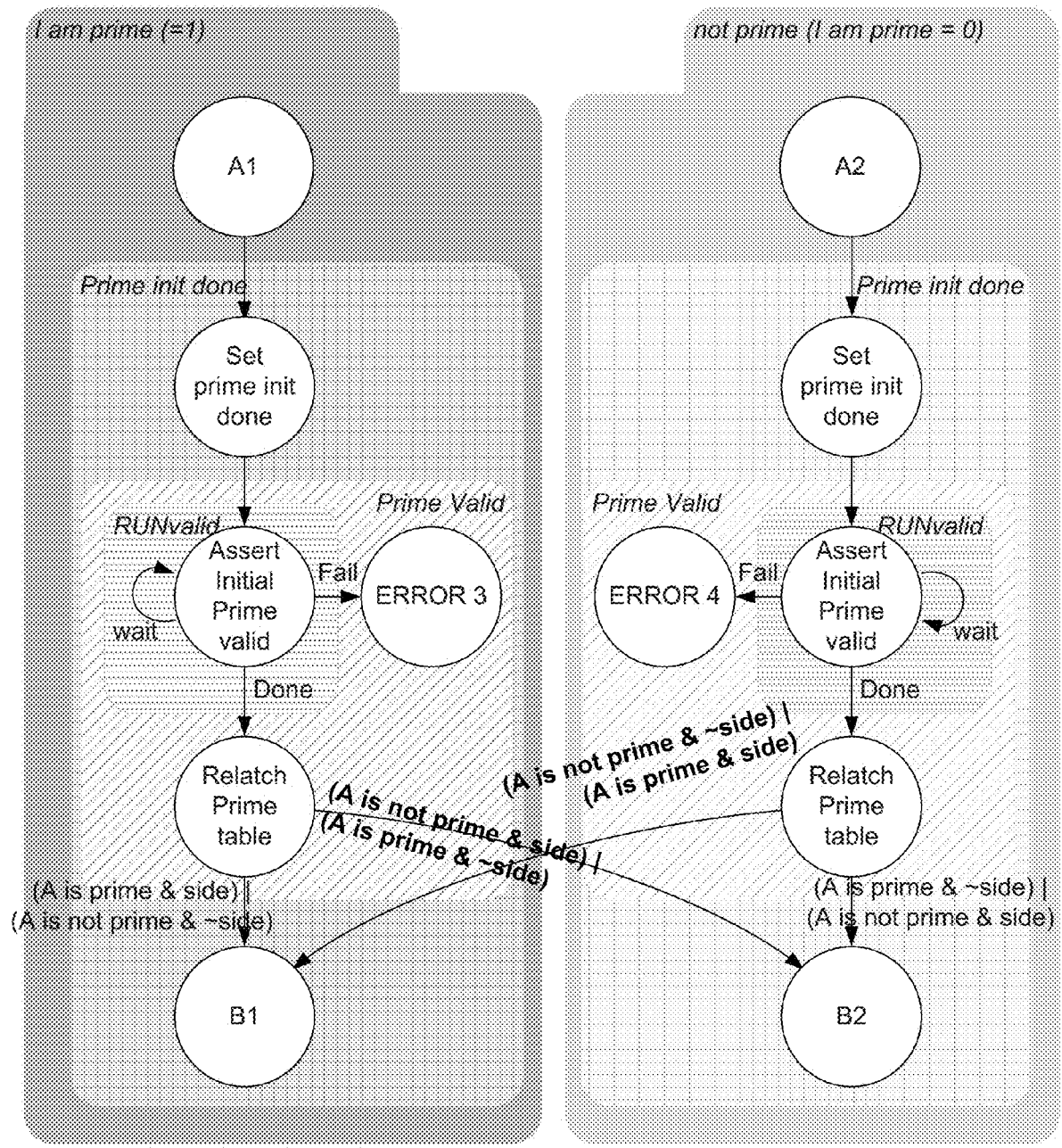
Figure 3C:
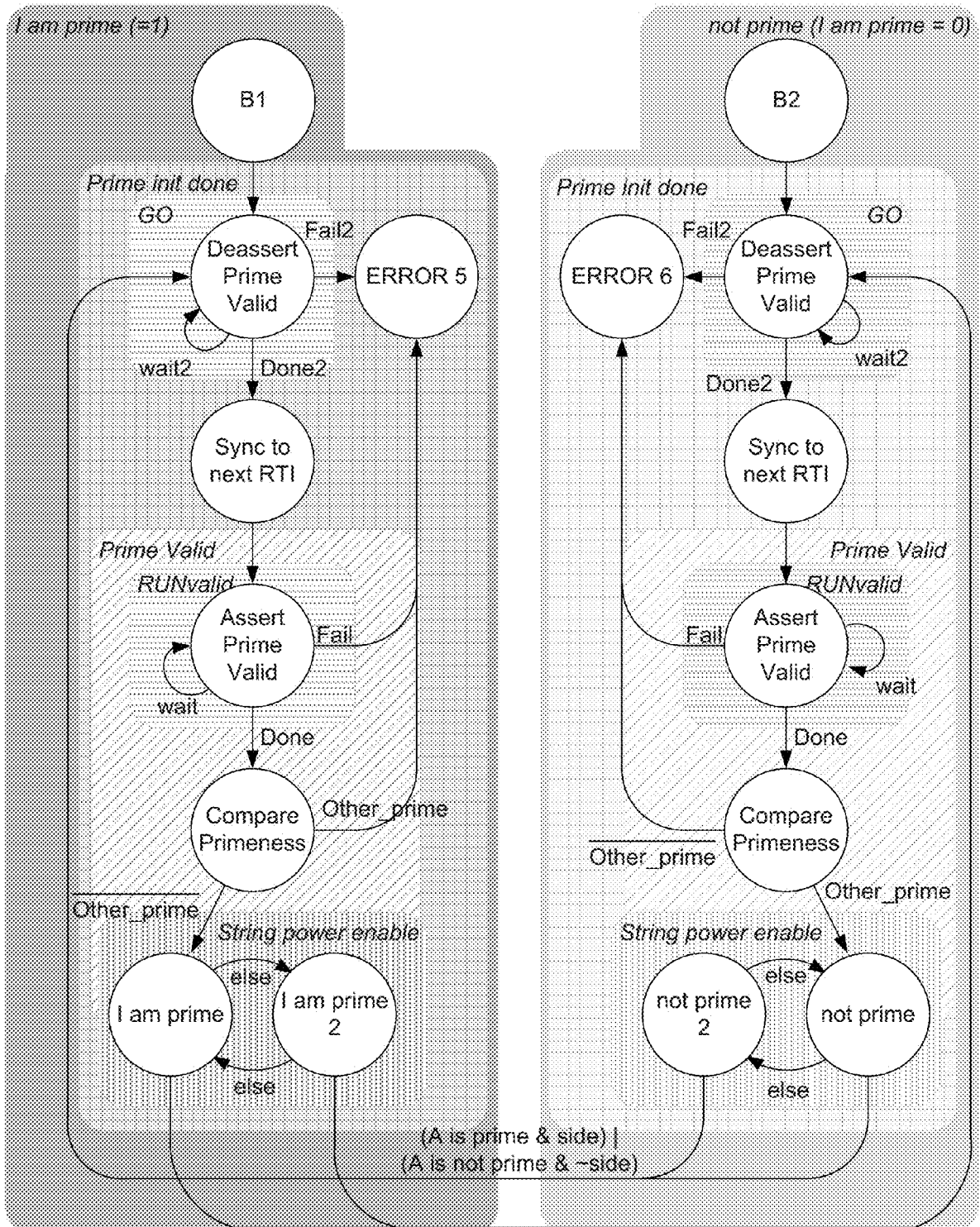

A PSM that incorporates two paths in accordance with an embodiment of the invention is conceptually illustrated in FIGS. 3A-3C. In the illustrated embodiment, the path that is executed when the associated processing system is prime is shown in green and the path that is executed when the processing system is an offline string is shown in blue. I_am_prime is asserted whenever the PSM is in one of the green states.

Referring first to FIG. 3A, as soon as a reset is de-asserted the PSMs in the ETMs within the FMU need to define prime and the state machines enter the "START" state. The process of defining the processing system that will be the prime string involves enabling the Time modules in the ETMs to synchronize the RTI, which the ETMs will use to sequence their PSMs. In many embodiments, the PSMs employ a watchdog timer that will reset an ETM when a PSM fails to toggle within a small number of RTI cycles (e.g. 8 RTI cycles).

Once synchronization is achieved, the PSMs leave the "START" state. Prime is initially defined based upon a heuristic (e.g. a predetermined processing system, the processing system that was last prime, or a randomly selected processing system). The FMU can assume that the initial selection of the processing system that should be prime is correct 1 out of N times, where N is the number of redundant processing systems. This uncertainty is typically not a problem, because the rest of the system is assumed to be depowered or held in reset.

The state machine can then transition to the "Wait for CSC load" state. CSC refers to Critical State Control parameters that are typically stored in redundant non-volatile memory. When each PSM comes out of reset, its task is to work with the PSMs in the other ETMs to define the prime string based on the parameters defined by the CSCs. Given a Power-on Reset (POR), the PSM typically must wait until a CSC loader has completed its function of reading the CSCs out of non-volatile memory and configured the CSC working registers. These CSCs define the parameters of the boot. Once the CSC_load_done signal has been asserted, the PSM will have all the information it needs to boot the processing systems. The CSCs define the processing system that should start as prime at powerup unless (or until) conditions show that it is unable to perform its function. In many embodiments, the CSCs can also include an instruction that the system should boot into a mode in which only a single processing system executes (i.e. a single string mode).

While in the "Wait for CSC load" state, the task of the PSM is to wait ("waitosc") a specified number of RTI cycles for an assertion of a "doneosc" signal indicating the loading of the CSCs. In the event that a "doneosc" signal is not received in time, an Error state (e.g. Error 1 or Error 2) is returned. Due to the nature of the synchronization between PSMs, there is a chance that PSMs in different ETMs could not exit the "Wait for CSC load" state in the same RTI. This is not a problem, because it can be resolved later during a synchronization state.

Upon successful exit of the "Wait for CSC load" state, the CSCs are loaded and the PSMs can progress to a next phase of initialization. A "Sync to next RTI" state is provided in which the CSCs are loaded into the State Table. Note, where the PSMs are not synchronized, the PSMs need not be re-synchronized in this state.

With the state table able to calculate prime from the inputs of the CSCs and the PWB pins, the PSM can process the table value and transition to determine prime based upon the calculated result.

Once the transition based upon the CSCs has occurred, this will most likely be the configuration of prime with which the processing systems will be booted. In many embodiments, at this point each ETM has calculated prime independently without knowledge of what the other ETM calculated. Before the SHs are powered and the processing systems are booted, the ETMs are ideally synchronized to the RTI and any potential errors or disagreements are tested and resolved. Accordingly, in several embodiments of the invention, the PSMs transition through a series of states that attempt to resolve errors and/or disagreements between ETMs prior to booting of the SHs and processing systems. These states are conceptually illustrated in FIG. 3B.

Referring now to FIG. 3B, once the PSM has defined prime based on the CSC inputs, a prime_init_done flag can be set in the "Set prime init done" state. In a number of embodiments, this flag scales the state table to add the inputs from the other ETMs into its calculation of prime.

While asserting its own prime_valid, each PSM is in a "Assert Initial Prime Valid" state to wait for the prime_valid from the other ETMs. Once the PSM detects the prime_valid from the other ETMs the PSM can transition to a "Relatch Prime Table" state. Since this state transition only happens when all prime_valid signals are asserted, all PSMs will make this transition at the same RTI thereby establishing synchronization between each of the ETMs in the FMU.

When the inputs from the other ETMs are added to the state table, the PSM can replicate the evaluation of prime for each of the other ETMs. In several embodiments, the evaluation of prime for each of the other ETMs also involves determining the error state of each of the ETMs as reported by its collector. Performing these calculations can enable resolution of any errors and/or disagreements in a manner that enables the explicit definition of one of the processing systems as the prime string and the remaining processing systems as offline strings. Furthermore, the calculations prevent multiple ETMs declaring their associated processing systems to be the prime string or for none of the processing systems to be claimed as the prime string. As is discussed below, a final check is performed to verify that only one processing system is declared as prime prior to boot up of the processing systems.

It is possible that after the calculation of the prime that the result is that the processing system that is prime is different to the processing system that was originally determined to be prime based upon the CSCs originally available to the PSM. Therefore, the transition from the "Relatch Prime Table" state can result in a switch between the two paths within the PSM.

Referring now to FIG. 3C, after the transition from the "Relatch Prime table" state based upon the calculated prime is completed, prime_valid is de-asserted in the "Deassert Prime Valid" state. Each PSM waits for the other PSMs to confirm the same de-assertion. Since the PSMs regained synchronization earlier in the process, it is expected that the each PSM will step through these states each RTI. Once the PSMs have verified that all prime_valids are de-asserted, the PSMs can proceed to a "Sync to next RTI" state. If for some reason one PSM fails to de-assert prime_valid this will send the PSMs into an error response state (e.g. ERROR 5 or ERROR 6).

After de-assertion of prime_valid, each PSM re-asserts prime_valid and the transition of the other PSM is verified in the "Assert Prime Valid" states. At this point each PSM is synchronized and ready for a boot phase in which the string handlers and processing systems are booted up. Prior to the boot phase, however, the PSM performs a final verification that there is only one prime and agreement regarding the processing systems that are offline strings in the "Compare Primeness" state. This check is to catch any problem which has resisted correction and will result in an error. In many embodiments, disagreement at this state results in fallback logic forcing all of the ETMs to accept a particular processing system as the prime string.

After passing this comparison, each PSM enters states which represent the runtime mode of the PSM and the ETM as a whole. Each PSM ping-pongs between two states such that the state machine change watchdog stroke is satisfied. While in these states, each PSM asserts the string_power_enable which is the enable with allows the string handler to be powered for each string. As can be seen, once string_power_enable is asserted the PSM will remain in these states until signaled from the state table that the status of prime has changed. In this case, each PSM is flagged by its state table that prime has changed strings and each PSM will re-execute the prime-valid handshake sequence described above and then return to runtime operation.

While various PSM implementations are described above with reference to FIGS. 3A-3C, any of a variety of PSM implementations involving determination of a prime string during bootup and ongoing operation based upon information from each of the ETMs can be implemented as appropriate to the requirements of different applications in accordance with various embodiments of the invention. Processes for managing the boot up of the string handlers and processing systems within fault tolerant computer systems in accordance with various embodiments of the invention are discussed further below.

String Handler Boot Controllers

In a number of embodiments, a PSM initiates boot up of the SHs. The boot up of the SHs can be coordinated by a String Handler Boot Controller (SHBC). In many embodiments, the SHBC is implemented as a finite state machine. As with the PSMs, the state machine of the SHBC is instantiated in each ETM and is designed to operate as the prime string or an offline string. Unlike the PSM, the state machine for the SHBC is not symmetrical as different criteria are utilized to boot the processing system associated with the string handler depending upon whether or not it is prime. For the prime side, the processing system is booted when the string handler is powered.

In several embodiments, the non-prime string only powers its processing system when a diagnostic mode is requested. In a number of embodiments, the state machine of the SHBC supports at least four modes including (but not limited to) a runtime mode, a ready mode, an online mode, and a diagnostic mode. The "runtime" mode indicates that the ETM has completed initialization and the string handler is initialized. In the runtime mode, the state machine will ping-poing between two states. There is an external watchdog timer that monitors the time the ETM spends in "runtime" mode to respond to the failure of the string handler to come out of initialization. The "ready" mode occurs after the string handler has been initialized by the ETM and is ready to proceed with booting the processing system. "Online" mode refers to the operational mode for the fault tolerant computer system in which the prime string processing system is powered and operating. In many embodiments, the offline strings are depowered in "online" mode. When the state machine of the SHBC is in "diagnostic" mode, the string handler can power up and boot a diagnostic software image for a non-prime processing system. In this mode, the string handlers can also establish a communication connection between the prime processing system and the non-prime processing system that is in "diagnostic" mode to enable the prime processing system to perform tests, configure, and/or repair the offline string processing system without having to boot it as the prime string.

Figure 4A:
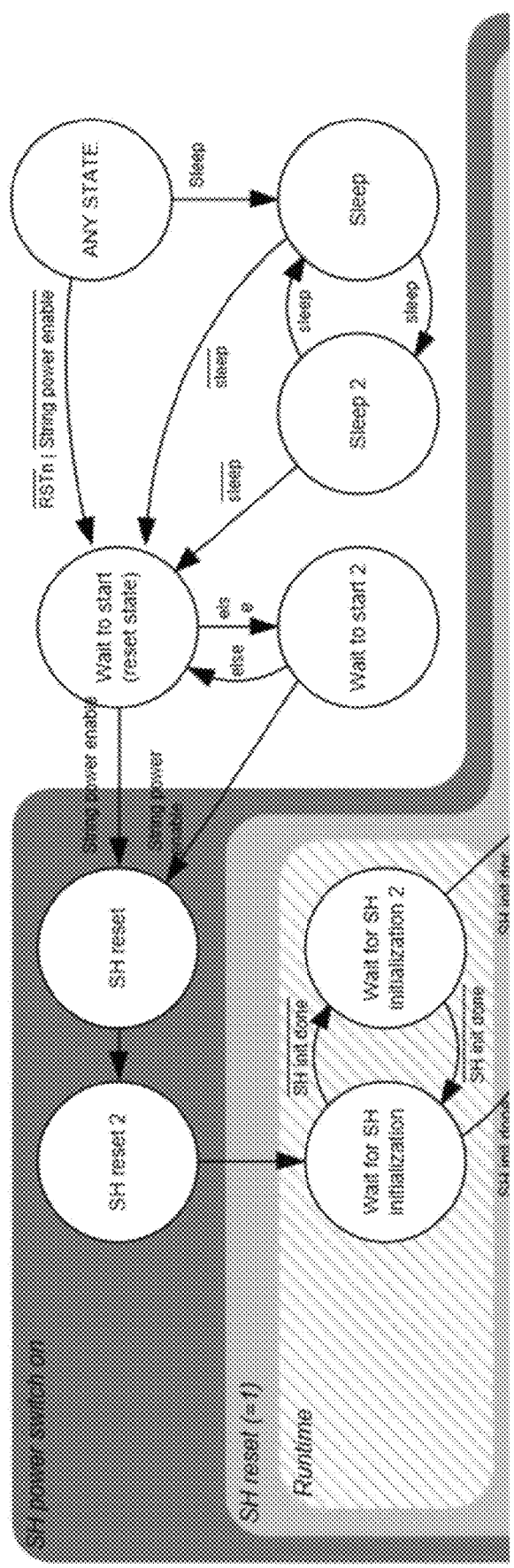
FIGS. 4A-4C conceptually illustrate an implementation of a state machine for a String Handler Boot Controller (SHBC) in accordance with an embodiment of the invention.
Figure 4B:
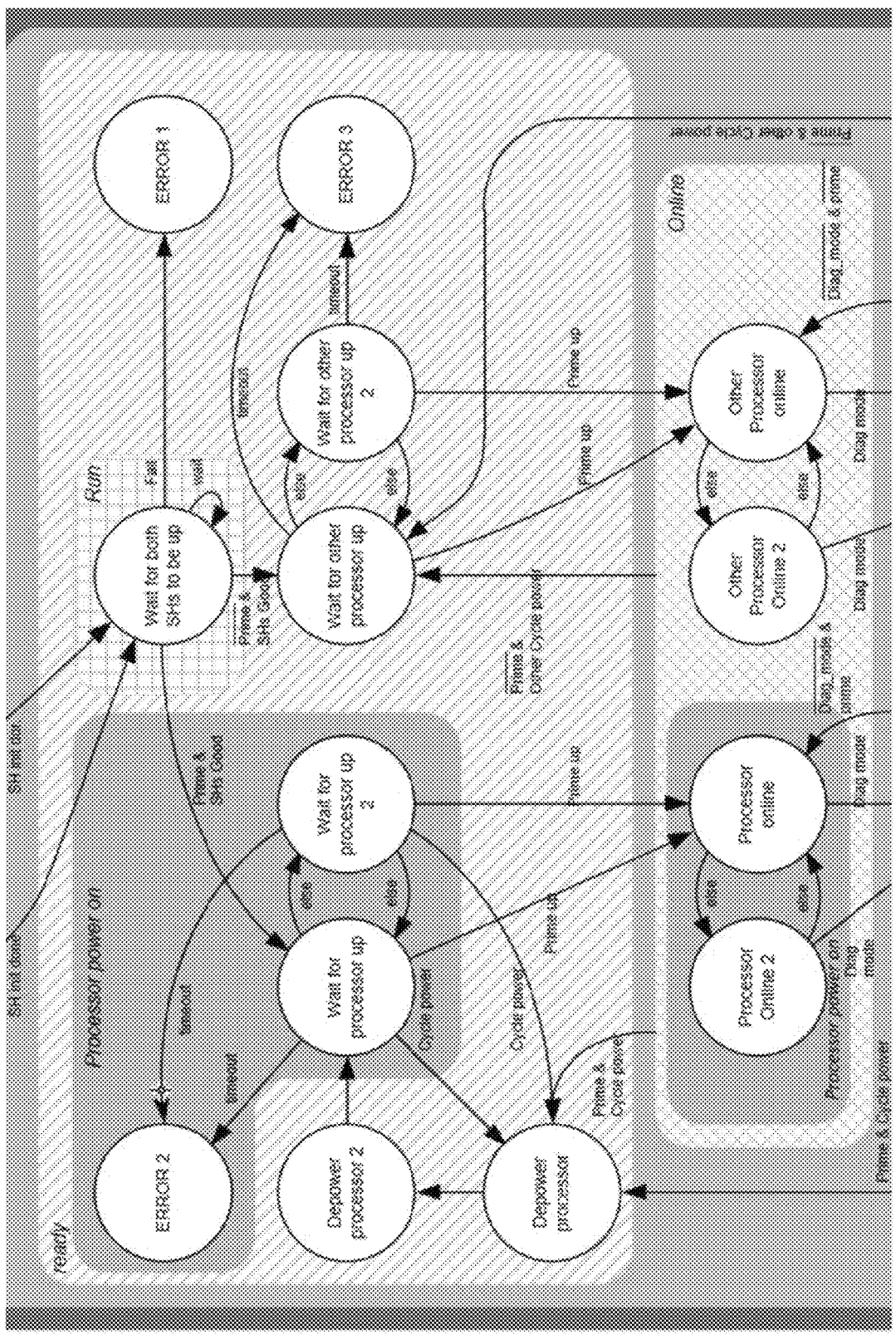
Figure 4C:
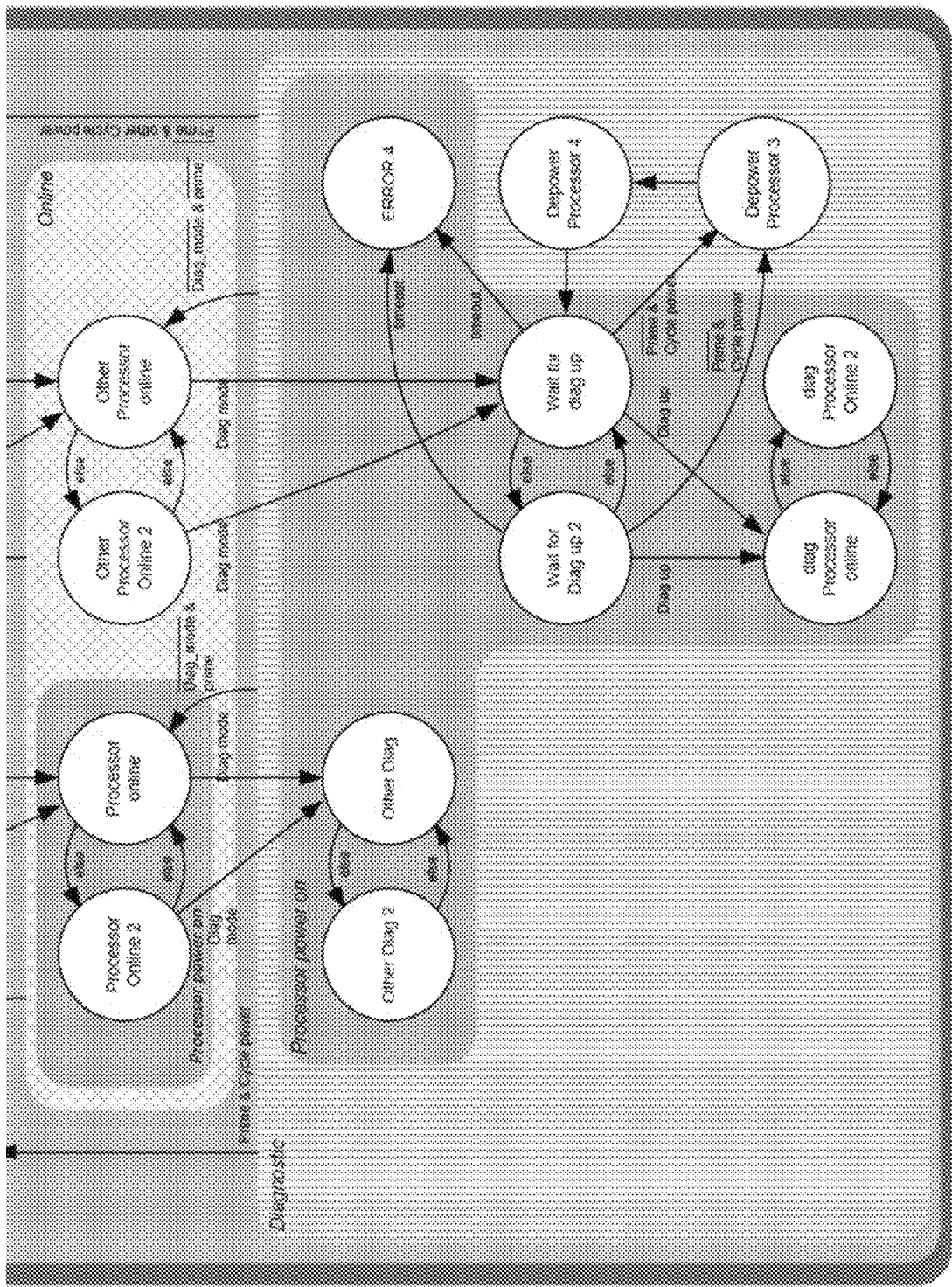

A state machine for a SHBC in accordance with an embodiment of the invention is conceptually illustrated in FIGS. 4A-4C. Refering first to FIG. 4A, in response to a POR, the SHBC enters a "Wait to start" state until an associated PSM in the ETM has completed its initialization sequence and asserts string_power_enable. The "wait to start" state is a ping-ponged state.

During initialization, the SH_reset input to the string handler is held low. Once the string_power_enable is asserted, power can be applied to the string handler circuitry by the ETM. Two RTI's later the SH_reset will be de-asserted. The SHBC transitions between states associated with the de-assertion of SH_reset and enters "runtime" mode while it waits for the string handler to complete its initialization.

Referring now to FIG. 4B, it can be readily appreciated by one of ordinary skilli in the art that the sequence described with reference to FIG. 4A is being executed in all SHBCs. Therefore, once the string handler is initialized, the SHBCs wait for all SHBCs to assert their Ready mode flag. In the illustrated embodiment, the assumption is made that there are two SHBCs. In other embodiments, two or more SHBCs can be present. When the SHBCs are synchronized, they can proceed to their next states depending upon whether or not the string handler is associated with the prime processing system. If a timeout occurs the state machine can enter an error state (e.g. Error 1).

The prime string handler will power up the processing system and wait for it to complete its boot-phase. This may require many seconds so the states ping-pong between "Wait for processor up" states while waiting. In several embodiments, there can be three possible behaviors for the SHBC state machine at this time. First the state machine can transition to "online" mode when the processing system is up and running. Second would occur if the prime boot controller in the SH encounters a problem booting the processing system and requests the cycling of power. The SHBC state machine can transition to "Depower processor" states which can temporarily turn off power to the prime processing system. The SHBC state machine can repower the processing system and return to the "Wait for processor up" state. Third is a timeout which can be caused by a watchdog which has triggered because the maximum time given for the processing system to boot has been exceeded. The value of timeout can be large enough to cover multiple boots and is really responsible for breaking permanent freezes or endless boot cycling. Once the watchdog is triggered, the SHBC can transition to an error state (e.g. Error 2) while the state table can trigger the PSMs to select an alternative processing system as the prime string.

The non-prime branch of the SHBC state machine can exhibit simpler behavior, it waits until its state table reports that the prime processing system is powered up in the "Wait for other processor" states. It also has a watchdog timer which will timeout if the prime side fails to boot and trigger an error state (e.g. Error 3). The timeout response for the non-prime side can be long enough such that a timeout may initiate the commandeering or re-determination of prime.

When the prime processing system is powered up, the SHBC state machine enters "online" mode, which is the nominal operational mode for the fault tolerant computer system. In this mode each SHBC ping-pongs between "Processor Online" states when prime or "Other Processor online" states when non-prime to keep the state machine watchdog stroked. In a number of embodiments, three events can cause the SHBC to exit these states: 1) system software requesting "diagnostic" mode, 2) system software requesting a "sleep" mode, or 3) a failure which results in the depowering of the prime string handler. As can readily be appreciated, any of a variety of states can be implemented within an SHBC state machine to support the ongoing operation of a fault tolerant computer system as appropriate to the requirements of specific applications in accordance with various embodiments of the invention.

Referring now to FIG. 4C, the manner in which the SHBC state machine responds to a request to enter "diagnostic" mode is conceptually illustrated. "Diagnostic" mode can be initiated by system software and conceptually mirrors the "ready" mode described above with the exception that multiple SHBCs have power applied to their respective processing systems. In several embodiments, the SHBCs can remain in "diagnostic" modes until one of: a) system software terminates the "diagnostic" mode, b) an error in booting the offline string kicks the SHBCs back into online mode, or c) "sleep" mode occurs.

While various implementations of SHBC state machines are described above with reference to FIGS. 4A-4C, string handlers can be implemented using any of a variety of approaches to manage the booting of processing systems and/or monitoring of offline strings as appropriate to the requirements of specific applications in accordance with various embodiments of the invention.

Processor Boot Controller

Processing systems in accordance with many embodiments of the invention can support one or more boot modes including (but not limited to) a cold boot, a soft boot, a warm boot, and a clean boot. In addition, the processing system may possess the capability to boot into one or more of a diagnostic mode in which an image is utilized that enables a non-prime processing system to undergo diagnostic testing, and/or a safe mode in which the processing system boots into a single-string configuration using a unique image. A boot process for the processing system can involve multiple phases. Typically, each boot phase is a set of related operations upon whose success the next phase of the boot can be built.

The nature of the boot process is often determined based upon whether the processing system is power cycled or simply reset. The boot process can also involve a number of diagnostic checks of various sub-systems including processing systems, hardware systems, and memory components.

The processor boot controller (PBC) is the main FDU module in the String handler which tracks the booting of the processor. The PBC evaluates the accuracy to which the actual boot follows the expected boot flow.

In a number of embodiments, each boot mode is defined within Startup ROM (SUROM) and the configuration of the processing system is determined by an Initial Partition Loader (IPL) that selects the particular partition of the non-volatile memory that is utilized during bootup. The PBC can evaluate the accuracy of the boot flow by tracking the SUROM progress through the boot phases. The PBC can set the registers used by the SUROM to perform the boot. If the processor fails booting, the PBC can modify these registers in order to achieve a successful boot. In many embodiments, the PBC does not interact with the SUROM directly, but can look for indicators that tell the PBC that one or more key activity checkpoints for each phase has been achieved.

In many embodiments, the PBC can be implemented using two state machines: a Phase Detector State Machine (PDSM); and a Fault Detection Unit state machine (FDUSM). The PDSM tracks the booting of the processing system through its various boot phases. As can readily be appreciated the implementation of the PDSM is largely dependent upon the specific processing system and the boot modes supported by the processing system. Proper function of the SUROM has both the SUROM and PDSM incrementing through each phase and maintaining sync. If an error occurs during the boot sequence, then it is the responsibility of the PDSM to detect it and report to the PBC that an error has occurred. In many embodiments, when a boot error occurs the PDSM hangs in an error state and waits for a response from the FDUSM, which can reset the PDSM when the response has been calculated so that the boot cycle can begin again.

The FDUSM is responsible for monitoring the boot of the processor via the reported success/failure from the PDSM. In many embodiments, the FDUSM contains logic for responding to a boot failure depending on the phase in which the error occurred, as well as logic to remember previous boot attempts and adjust the boot parameters to create a condition where the boot can be successful. The FDUSM can also include logic for executing a reboot requested from software.

Figure 5:
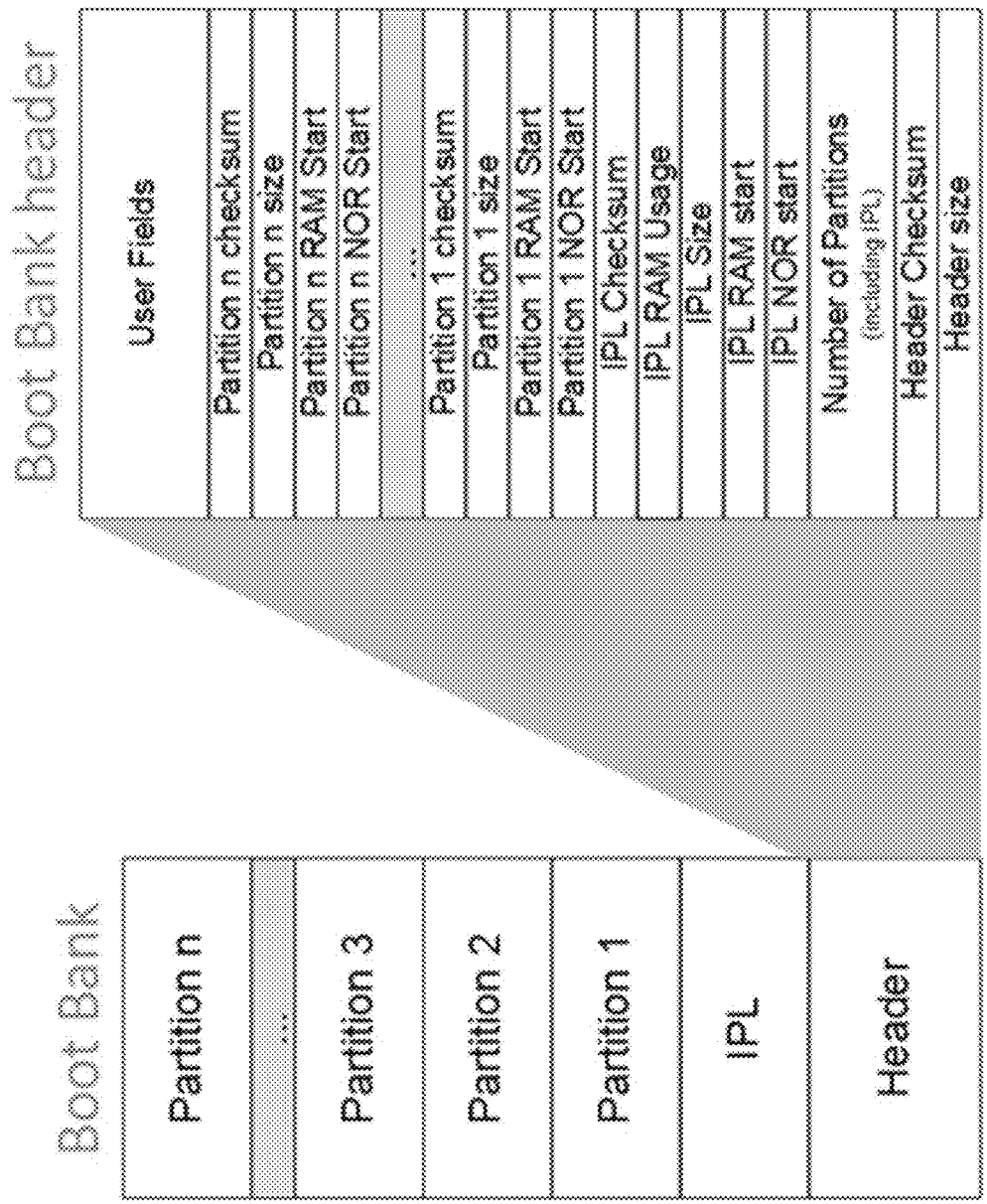
FIG. 5 conceptually illustrates a notional map of software of a processing system.

During bootup, the SUROM can read the header of a non-volatile memory image to locate an IPL partition. A notional map of processing system software is shown in FIG. 5. There can be multiple partitions within a system software image, which may or may not be loaded later, but in many embodiments the SUROM is only interested in loading the IPL partition. The SUROM can cause a processor to read the header to locate the IPL image, which can be the first partition in the image. If the user has a single partition and does not need an IPL, the user can simply use the first partition.

After locating the IPL partition the SUROM can cause a processor to read the IPL parameter fields from the header and determine an amount of dynamic memory to be used as well as the suggested RAM start location for the IPL. The SUROM can cause the processor to perform a memory test of the memory space required by the IPL and then write the bad memory table to the non-volatile memory of the FMU. If the initial memory space is corrupted, the SUROM can trigger an error.

An IPL partition can be copied into dynamic memory and then validated, and if valid the SUROM can cause the processor to jump to the IPL start address to commence execution. At this point the SUROM is completed, although the SUROM can include a small amount of code to support a return (RTN) which can write a breadcrumb to FMU non-volatile memory and then send a fail code, but it is expected that this memory will be considered re-allocatable and cleared.

The function of the IPL can be whatever the processing system requires, but there is often a requirement that the IPL stroke the FMU watchdog to avoid the PBC from triggering a failure response. Furthermore, as noted above, the successful progression of the SUROM and IPL through the various phases of bootup to achieve a stable system is confirmed by the PDSM, which is in turn monitored by the FDUSM.

While specific implementations of processor boot controllers and processing systems are described above, any of a variety of systems can be implemented to confirm the successful bootup of a processing system into a stable configuration as appropriate to the requirements of specific fault tolerant computer systems in accordance with various embodiments of the inventions. Additional modes that can be supported by FMUs implemented within fault tolerant computer systems in accordance with various embodiments of the invention are discussed further below.

Sleep Mode

In a number of embodiments, the FMU can provide a sleep mode to reduce power consumption. Sleep mode can allow software to command the FMU to depower the processing systems and/or the majority of the FMU for a specified number of seconds. While in sleep mode, the FMU can maintain time and time distribution, arbitration of prime, as well as communication to the power subsystem. As can readily be appreciated, the specific sub-systems that are depowered and the specific sub-systems that maintain power during sleep mode are largely dependent upon the requirements of a given application.

Diagnostic Mode

In several embodiments, the FMU can provide a Diagnostic (Diag) mode. Diag mode can allow software to command the FMU to power a non-prime processing system and establish a communication connection between a prime processing system and a non-prime processing system in order to perform diagnostics. Diag mode provides a safe, multistep way to boot and analyze a non-prime processing system without booting it as prime.

Fault Tolerant Avionics Systems

Fault tolerant computer systems in accordance with many embodiments of the invention can be utilized as avionics systems. Today's state-of-the-art deep-space spacecraft typically have a single prime control processor at the center of their avionics, and this can limit the amount of processing power available, the robustness of the system to faults, and/or the timeliness of responses to errors in the processor. A redundant processing system with an additional copy of the processor can be added to cover these faults and can increase robustness. In a number of embodiments, a spacecraft avionics system is constructed that utilizes at least two redundant processing systems that are monitored using an FMU. In several embodiments, the processing systems are implemented using Sabertooth processing boards. In other embodiments, avionics systems can be implemented using any of a variety of different computing platforms appropriate to the requirements of specific applications.

In many embodiments, the FMUs are implemented using Field Programmable Gate Arrays (FPGAs). In a number of embodiments, each ETM and SH within the FMU is implemented on a separate FPGA. As can readily be appreciated FMUs can be implemented using one or more and/or a combination of discrete components, Application Specific Integrated Circuits (ASICs), FPGAs, microprocessors, and/or microcontrollers in in accordance with various embodiments of the invention.

Figure 6:
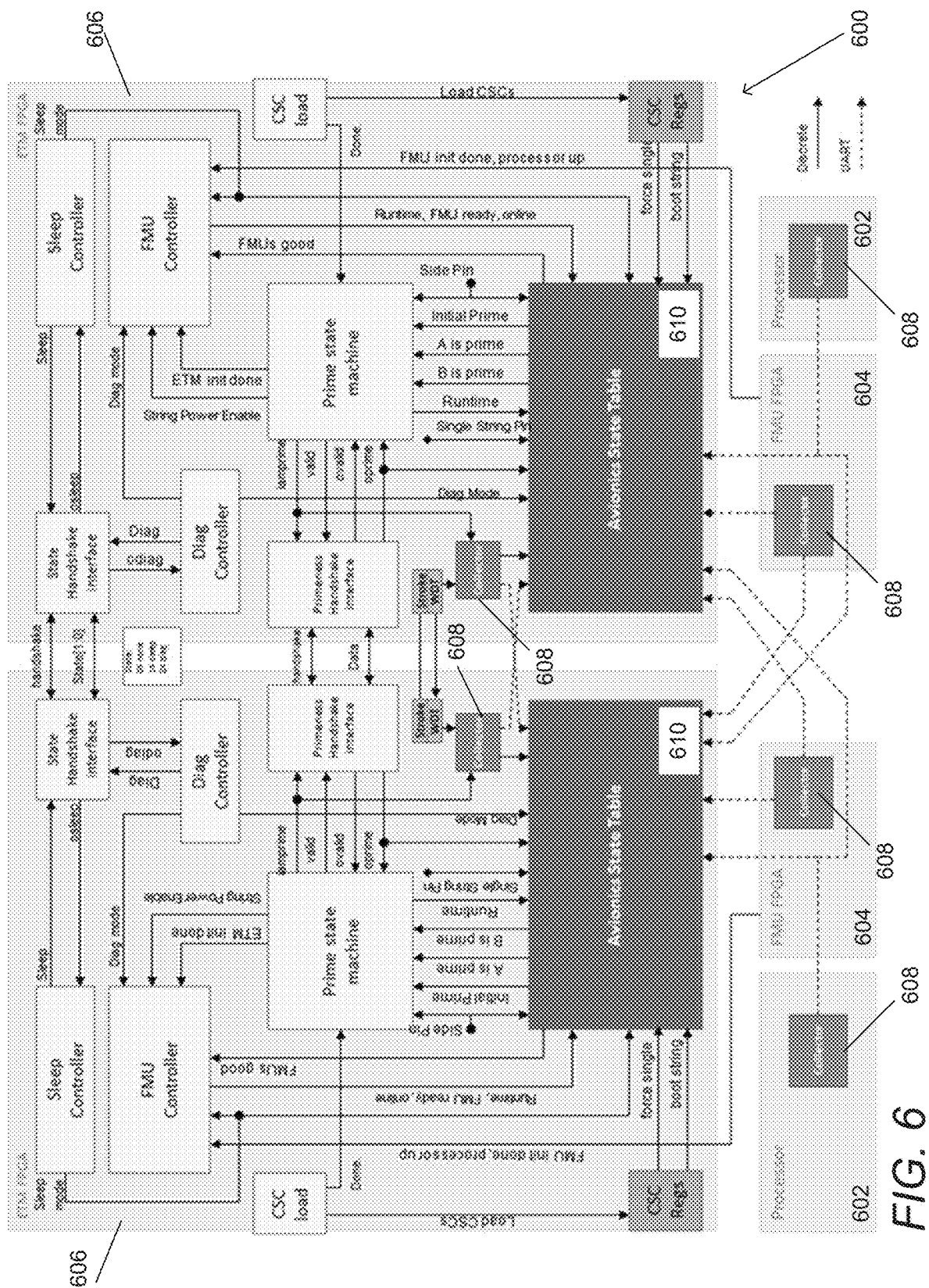
FIG. 6 is a block diagram of an avionics system developed for use in small spacecraft in accordance with an embodiment of the invention.

An avionics system developed for use in small spacecraft in accordance with an embodiment of the invention is illustrated in FIG. 6. The avionics system 600 is implemented using two Sabertooth processing boards 602. Separate FPGAs 604 are used to implement the SHs associated with each processing board. In addition, separate FPGAs 606 are utilized to implement the ETM associated with each processing board. Collectors 608 present within the Sabertooth processors, the SH, and the ETM are utilized to provide input data to avionics state tables 610 in each of the ETMs. The FPGAs 606 that implement the ETMs include logic to implement PSMs similar to those described above, which determine the Sabertooth processing board 602 that will act as the prime string for the avionics system based upon the avionics state table 610.

The manner in which an FMU in accordance with an embodiment of the invention determines the prime string can be appreciated by considering an example of a state table that can be utilized within an avionics system similar to the system illustrated in FIG. 6. An exemplary avionics state table constructed in accordance with an embodiment of the invention is illustrated in FIG. 7. The avionics state table inputs are represented as columns and the rows represent the unique combinations of inputs define an avionics state. The avionics state table also includes columns that define outputs. For a given context, the PSM can identify a row corresponding to the current inputs that are relevant to the context and select the processing system that should be the prime string based upon the outputs indicated in the avionics state table. As discussed in detail above, the avionic state table for a particular ETM not only includes the inputs generated with respect to the processing system and FDU to which the ETM belongs, but also includes the inputs collected by the other processing systems and their associated FDUs. In this way, all of the information relevant to the determination of the prime string is available to each ETM and can be utilized to resolve conflicts between ETMs. As can be seen in FIG. 7, the collectors provide important inputs to the avionics state tables. A set of inputs generated by collectors in an avionics system similar to the avionics system shown in FIG. 6 in accordance with an embodiment of the invention is illustrated in FIG. 8. The inputs include inputs from collectors in the ETMs, FMU collectors, and collectors implemented within the Sabertooth processing boards. As can readily be appreciated, the number and location of collectors utilized to obtain input data to a state table of a fault tolerant computer system is largely dependent upon the requirements of a given application.

While specific fault tolerant computer system implementations, state tables, and input data provided to state tables are described with respect to FIGS. 6-8, it should be readily be appreciated that any of a variety of fault tolerant computer systems for use in a number of different applications can be implemented using FMUs in accordance with the principles outlined above. Furthermore, the input data that is utilized to define state and the representations of state and/or state tables utilized within the FMUs is largely dependent upon the requirements of a given application.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A fault tolerant computing system, comprising:
   a plurality of processing systems that are each capable of performing as a prime string; and
   a Fault Management Unit, where the FMU includes Event Timer (ET) circuitry and String Handler (SH) circuitry for each of the plurality of processing systems;
   wherein each SH circuitry is capable of interfacing with one of the plurality of processing systems in a manner that creates an isolated fault containment boundary with respect to the processing system;
   wherein each SH circuitry is capable of obtaining input data via its interface with one of the plurality of processing systems;
   wherein each SH circuitry is capable of providing input data to each ET circuitry via redundant communication paths;
   wherein each ET circuitry comprises a state table, where state in the state table comprises inputs from each of the plurality of processing systems;
   wherein each ET circuitry is capable of assigning a selected processing system from the plurality of the processing systems to be the prime string based upon input data from each SH circuitry and the state table; and
   wherein the FMU assigns the selected processing system as the prime string when there is consensus between the ET circuitry that the selected processing system should be the prime string.

2. The fault tolerant computer system of claim 1, wherein each SH circuitry is also capable of obtaining input data from a collector within corresponding SH circuitry.

3. The fault tolerant computer system of claim 1, wherein each ET circuitry is capable of obtaining input data from a collector within corresponding ET circuitry and providing input data to each of the other ET circuitry via redundant communication paths.

4. The fault tolerant computer system of claim 1, wherein each ET circuitry further comprises a Prime State Machine (PSM), where the PSM assigns a selected processing system from the plurality of the processing systems to be the prime string based upon the state table.

5. The fault tolerant computer system of claim 4, wherein each PSM includes two paths:
   a first path when a processing system associated with the corresponding PSM is assigned as the prime string; and
   a second path when a processing system associated with the corresponding PSM is assigned to be an offline string.

6. The fault tolerant computer system of claim 4, wherein prior to booting of the processing systems, the corresponding PSM assigns a selected processing system from the plurality of the processing systems to be the prime string based upon Critical State Control (CSC) parameters retrieved from non-volatile memory.

7. The fault tolerant computer system of claim 1, wherein the corresponding state table indicates the processing system from the plurality of processing systems that should be assigned as the prime string based upon inputs from the plurality of processing systems.

8. The fault tolerant computer system of claim 7, wherein the corresponding state table further comprises dynamic inputs that represent a current mode of the selected processing system.

9. The fault tolerant computer system of claim 1, wherein:
each ET circuitry evaluates whether the selected processing system should remain the prime string and assigns the prime string to a second of the plurality of processing systems based upon input data from the corresponding SH circuitry and the corresponding state table; and
the FMU assigns the second processing system to be the prime string when there is consensus between the ET circuitry that the second processing system should be the prime string.

10. The fault tolerant computer system of claim 9, wherein the FMU is synchronized to a common Real Time Interrupt (RTI) and, during operation of the selected processing system as the prime string, each ET circuitry evaluates whether the selected processing system should remain the prime string once per RTI.

11. The fault tolerant computer system of claim 1, wherein the SH circuitry is capable of providing input data to each ET circuitry via Triple Mode Redundancy (TMR) in all logic and interfaces.

12. The fault tolerant computer system of claim 11, wherein input data received via the TMR are voted and corrected by each ET circuitry.

13. The fault tolerant computer system of claim 1, wherein the SH circuitry associated with the selected processing system is capable of booting the selected processing system following its selection as the prime string.

14. The fault tolerant computer system of claim 13, wherein the SH circuitry associated with the selected processing system comprises a String Handler Boot Controller state machine that supervises the booting of the selected processing system.

15. The fault tolerant computer system of claim 14, wherein the booting of the selected processing system comprises a plurality of phases.

16. The fault tolerant computer system of claim 15, wherein the boot phases of the of the selected processing system are defined within a Startup ROM (SUROM) and a software image is selected during booting of the processing system by an Initial Partition Loader (IPL) identified within the SUROM.

17. The fault tolerant computer system of claim 1, wherein the SH circuitry associated with a non-prime processing system is capable of booting the non-prime processing system in a diagnostic mode and establishing a communication path between the selected processing system that is the prime string and the non-prime processing system that is booted in the diagnostic mode.

18. The fault tolerant computer system of claim 1, wherein each ET circuitry and SH circuitry is implemented on a separate Field Programmable Gate Array (FPGA).

19. The fault tolerant computer system of claim 1, wherein the selected processing system is capable of performing the functions of an avionics system.

20. A fault tolerant computing system, comprising:
a plurality of processing systems that are each capable of performing as a prime string; and
a Fault Management Unit, where the FMU includes Event Timer (ET) circuitry and String Handler (SH) circuitry for each of the plurality of processing systems;
wherein each SH circuitry is capable of interfacing with one of the plurality of processing systems in a manner that creates an isolated fault containment boundary with respect to the processing system;
wherein each SH circuitry is capable of obtaining input data via its interface with one of the plurality of processing systems;
wherein each SH circuitry is also capable of obtaining input data from a collector within corresponding SH circuitry;
wherein each SH circuitry is capable of providing input data to each ET circuitry via redundant communication paths;
wherein each ET circuitry is capable of obtaining input data from a collector within corresponding ET circuitry and providing input data to each of the other ET circuitry via redundant communication paths; wherein each ET circuitry comprises a state table, where state in the state table comprises inputs from each of the plurality of processing systems, each SH circuitry, and each ET circuitry;
wherein each ET circuitry is capable of assigning a selected processing system from the plurality of the processing systems to be the prime string based upon input data and the state table;
wherein the FMU assigns the selected processing system as the prime string when there is consensus between the ET circuitry that the selected processing system should be the prime string;
wherein the FMU is synchronized to a common Real Time Interrupt (RTI) and, during operation of the selected processing system as the prime string, each ET circuitry evaluates whether the selected processing system should remain the prime string once per RTI;
wherein the ET circuitry associated with the selected processing system determines that the prime string should be transitioned to a second of the plurality of processing systems based upon input data and the state table; and
wherein the FMU assigns the second processing system to be the prime string when there is consensus between the ET circuitry that the second processing system should be the prime string.

* * * * *